US007010622B1

(12) United States Patent
Bauer et al.

(10) Patent No.: US 7,010,622 B1
(45) Date of Patent: Mar. 7, 2006

(54) SCALABLE COMMUNICATION WITHIN A DISTRIBUTED SYSTEM USING DYNAMIC COMMUNICATION TREES

(75) Inventors: Andreas L. Bauer, Maynard, MA (US); Brian R. Gruttadauria, Sutton, MA (US); Gregory W. Lazar, Upton, MA (US); Walter T. Dobberpuhl, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 684 days.

(21) Appl. No.: 09/877,862

(22) Filed: Jun. 8, 2001

(51) Int. Cl.
*G06F 15/16* (2006.01)
*H04L 12/28* (2006.01)
(52) U.S. Cl. .................... 709/252; 370/395.31
(58) Field of Classification Search ............... 709/203, 709/238, 227, 249, 252, 242; 370/395.31, 370/238, 351–392
See application file for complete search history.

(56) References Cited

U.S. PATENT DOCUMENTS

| 4,987,536 | A | * | 1/1991 | Humblet ................ 709/241 |
| 6,041,049 | A | * | 3/2000 | Brady ................... 370/351 |
| 6,098,107 | A | * | 8/2000 | Narvaez-Guarnieri et al. ................... 709/239 |
| 6,134,599 | A | * | 10/2000 | Chiu et al. .............. 709/252 |

* cited by examiner

*Primary Examiner*—Krisna Lim
(74) *Attorney, Agent, or Firm*—Robert Kevin Perkins; Leanne J. Fitzgerald; John M. Gunther (57) ABSTRACT

There is disclosed a technique for achieving scalable communication within a distributed system using dynamic communication trees. In a client server environment, and particularly in such an environment in which storage systems and storage area networks are managed by distributed management software, embodiments of the present invention are presented by which communication trees are built in a manner that evenly distributes load throughout nodes in the network, whereby scalability is enhanced allowing a larger number of nodes than otherwise allowable without such trees. Other advantages achievable by utilization of such trees are also disclosed.

66 Claims, 7 Drawing Sheets

SCALABLE COMMUNICATION WITHIN A DISTRIBUTED SYSTEM USING DYNAMIC COMMUNICATION TREES

BACKGROUND OF THE INVENTION

1. Field of the Invention

The present invention relates generally to scalable communication within a distributed computer system and relates, more particularly, to management software in a client-server network environment controlling communication between either the client and/or each node of a group of one or more nodes of the network on the one hand, and all remaining nodes of the network including those in the group on the other hand, by way of one or more dynamically-configured communication trees.

2. Description of Prior Art

The computer industry has been growing very rapidly. It includes various sub-industry segments such as computer hardware, computer software, etc. In the computer software arena, various well-defined categories of software have been developed including operating system software, applications software, utility software, management software, etc. The latter category is also known as "distributed management software" if distributed over components of a computer system or over nodes within a computer network such as a client-server network. Such software functions to manage or aid in management of computer system or computer network operation. For example, if storage system components are deployed in a computer system or in a client-server network environment running certain distributed management software, that software can be useful in obtaining and analyzing information about operating states of these storage systems. Operation of such software can result in detecting failed or deteriorated components, thereby assisting in overall management of the computer system or client-server network. This is one environment in which embodiments of the present invention are useful.

If this client-server network environment is running object-oriented software, then, typically, many objects reside in each of these components or nodes and information from each of these objects may be necessary to satisfy certain information requests in pursuit of executing certain management software functions. An object, also sometimes referred to as a node, in computer software terms, is a dedicated area of memory which can be thought of as an impervious container holding both data and instructions within itself, both defining itself and its relationships to other objects in the computer system or network. An object or node can send and receive messages to and from other objects, respond and react to such messages (e.g. commands) but shall normally be impervious to internal scrutiny. For example, in a storage processor (a kind of computer) each object may describe or relate to a specific tangible detail in the processor (e.g. a fan, power switch, cache memory, power supply, disk drive interface, etc.), where these tangible objects in the storage processor can send messages to each other and to other objects outside the processor. The relationship between these specific objects in the storage processor is usually visualized or characterized as a "tree" of objects or nodes. In a tree, each such object hangs off a preceding object as if in a parent-child or inheritance relationship, with many children hanging from a parent not being an atypical configuration. A child node which, in turn, has no children hanging from it is sometimes called a "leaf" node or object since it may have some resemblance to a "leaf" dangling from a tree. In addition to these tangible kinds of objects, logical units (LUNs) are other nodes or objects that can be contained within the tree. Object trees, typically, are permanent in the sense that once built they persist in memory and remain as configured.

Figure 1:
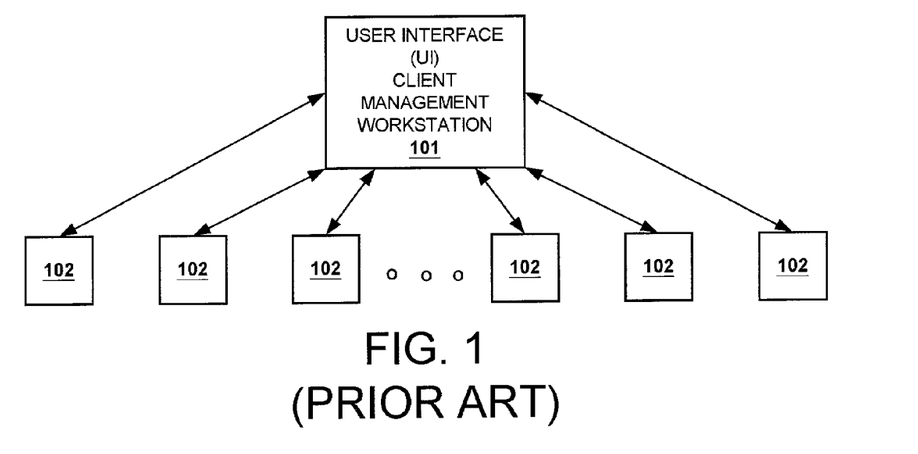
FIG. 1 is a block diagram of a first prior art client-server network configuration in which a user interface or client management work station communicates with its components or nodes.

Typically, in a client-server network environment in which object-oriented software is employed, there can be many components or network nodes or objects comprising the network. Referring to FIG. 1, there is shown a prior art view of a user interface (UI) or client or management workstation 101 operatively coupled by way of bidirectional busses to a series of components or network nodes 102. In this Fig. there are only six such network nodes shown, but they are associated by dots to imply that the number can be much greater. In certain cases, the number of such network nodes or objects can become very large or scalable and exceed one-thousand and possibly exceed ten-thousand. In the configuration shown all nodes are directly connected to client 101. For large numbers of nodes, this typically results in a severe drain upon resources of client 101 as it must deal with each node or object or component 102 separately. This drain, in turn, results in client 101 not being able to process other, and possibly more important, information of which it would otherwise be capable.

Figure 2:
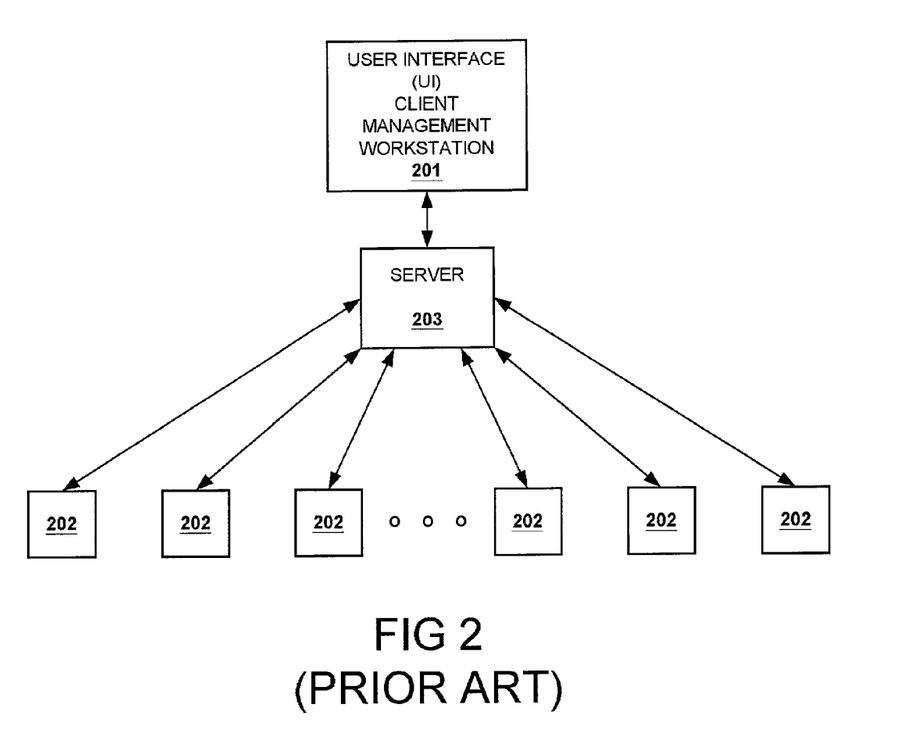
FIG. 2 is a block diagram of a second prior art client-server network configuration in which a user interface or client management workstation communicates with its components or nodes through an intermediary server.

One prior art improvement to this severe drain of client resources problem is shown in FIG. 2, wherein a large server (a computer system or portion thereof dedicated to serve in a particular capacity) is introduced. In this configuration, client 201 is communicatively coupled by a bidirectional bus only to server 203. Server 203 is communicatively or operatively coupled by bidirectional busses to components or nodes or objects 202. (Again, more than six such nodes or objects are implied by the dotted association between the nodes, which again can number in the thousands, tens of thousands, or more.) A marginal improvement is achieved in this configuration because the communication load with nodes 202 is shifted from client 201 to server 203. This does free-up client 201 to an extent, but this server approach does have certain drawbacks. One serious drawback is that there is additional cost associated with server 203. Cost of server 203 relative to cost of each of nodes 202 can be disproportionately large, possibly by orders of magnitude, particularly where each of nodes 202 might be a small or medium-capacity storage system and where the server is very large. In this scenario, a user of these storage systems would normally not be inclined to spend huge amounts of money for a server to manage relatively inexpensive storage systems. In addition to costs of purchase, maintenance of such a server can be very costly because there is complexity associated with server 203 and the server itself has to be managed. This requires additional software which typically is expensive, and results in additional effort and responsibility for the user. Finally, this approach does not scale well, (this approach is not scalable or does not allow large numbers of nodes or objects to be managed) because single server 203 itself becomes a bottleneck when the number of nodes reaches a critical limit for the particular server being employed. Accordingly, a better solution than this intermediary large server solution is needed.

Another prior art approach sometimes used is called "broadcast". In this approach, in each broadcast the client sends out a singular communique to any and all nodes connected to the network that may, or should, be able to receive it. This is not sending a particular request to one particular node. This approach, which may be useful in certain networking environment applications employing routers, switches, bridges, gateways, etc., has limited value in the instant context of client-server distributed management software. There is no guaranteed delivery; if there is no response there is no information explaining the non-response. If the client simply "shouts-out", and all nodes and components who can receive and respond do so, then that begs the question: did all components and nodes respond? The system cannot determine if a non-response means that a particular node is inoperative or non-existent. Thus, there is insufficient precision under a broadcast approach which makes that approach unacceptable for many applications. Broadcast techniques will also not work in all network environments; the networks in which they will work must be pre-arranged to allow broadcast at a non-trivial expense. Furthermore, use of broadcast floods the entire network with continuous communiques, which overwhelms the environment and is simply not feasible or scalable for very large configurations.

Accordingly, a need exists for an inexpensive, accurate, robust, reliable and flexible technique for a client, or any node in a client-server network environment, to communicate with all other nodes—to send commands and receive responses—with virtually no practical upper limit to number of nodes that may be deployed throughout the network and in a manner that avoids prior art shortcomings. Embodiments of the present invention, including those disclosed herein, provide a welcome solution to these problems and shortcomings of the prior art.

SUMMARY OF THE INVENTION

Embodiments of the present invention relate to system, apparatus, method, and/or computer program product for managing a client-server network. A communication tree utilizing nodes of the network is established. Managing-commands are forwarded over the tree to the nodes. Responses to the managing-commands are received over the tree from the nodes. The tree is dismantled in response to completion of receiving the responses.

Embodiments of the present invention further relate to system, apparatus, method, and/or computer program product for communicating between any one node and all other nodes in a network. A directory data base is established in the one node and in all the other nodes and provides addresses of the one node and all the other nodes. A dynamic or instantaneously-reconfigurable communication tree is built by or from the one node in cooperation with all the other nodes in accordance with each of their respective addresses. Such a tree is not the permanent or persistent object tree of the prior art. Communication packets are established, each containing both a command to be executed and forwarding information based on configuration of the communication tree. The packets are forwarded from the one node to all the other nodes in accordance with the forwarding information. Each of the other nodes executes the command thereby providing a command response and returns the response to the one node. The tree utilized in embodiments of the present invention is referred to as a communication tree because it facilitates communication between the client workstation and its network nodes.

In a further feature of the present invention, the one node initiating the communication to all other nodes can be a client or user interface node, a server node, or another node. Any such node can be selected as the root node for the communication. If the selected root node is not operative a different node is selected. The root node is responsible for building the communication tree with itself as the root and for sending the request it receives from the client or from another request-source to its immediate children.

In a still further feature of the present invention, the addresses are internet protocol (IP) addresses and the children of any node in the communication tree are limited to no more than a fixed number. In a particular embodiment the fixed number is twenty. The tree is dismantled when communication between the one node or the client and all the other nodes in the network is completed. Another communication tree of the same or different configuration is rebuilt on as-needed basis in response to need established by the next command. The next command can come from the UI or from some other source.

In yet another feature of the present invention, operability of each one of all the other nodes in the communication tree that are parent nodes is determined, and if any one is not operative its child nodes are substituted seriatim in place of the inoperative parent node until an operative child node is determined.

In another aspect of the present invention, the command response is returned to the one node or the client in accordance with the following. A response list is created in each of all the other nodes in the communication tree. A parent command response is registered on its respective response list for each parent node situated within all of the other nodes. A command response from each of the children of each such parent node is also registered on its parent's respective response list thereby establishing a completed child command response. The parent command response is combined with the completed child command response in each such parent's respective response list, thereby obtaining a finalized response list. The finalized response list is returned to the parent of each parent node, which ultimately results in a return of all finalized response lists to the one node or the client workstation. Each response is returned to the one node or the client along a unique point-to-point path of the communication tree.

In yet another aspect of the invention, a plurality of nodes can simultaneously communicate with all other nodes in the network including those in the plurality utilizing a like plurality of dynamic communication trees, each one of the plurality of nodes being a root node of, or corresponding respectively to, a different one of the like plurality of dynamic communication trees. In this scenario, multiple commands are being executed simultaneously in the network along pathways established by these different dynamic communication trees that are each isolated from the other, whereby any one command transmission and response does not interfere with any other command transmission and response.

It is thus advantageous to utilize embodiments of the present invention in a client server network in which a large number of components or nodes or objects are deployed, whereby scalable communication can be obtained between the client and the remaining nodes in the network while, simultaneously, scalable communication can be obtained between a group of any one or more other nodes each acting as a root node of its respective communication tree and the remaining nodes in the network including those in the group comprising its respective communication tree. These advantages are obtained through, at least in part, usage of dynamic communication trees which are more robust than permanent object trees and lend themselves to more efficient usage in networks having large numbers of nodes. In any large-node network the likelihood that at least some of the nodes are inoperative is significant, and such likelihood can be readily be taken into consideration in embodiments of the present invention when building a new dynamic communication tree. By comparison, a permanent object tree applied to a large-noded network would make assumptions that certain nodes are present and operative which could likely not be the case, and any work-around in such permanent-tree instance can be complex and costly. Furthermore, dynamic communication trees are built on currently valid information in the directory database where, by comparison, permanent object trees have to be updated whenever new nodes are added to or removed from the network which adds latency and complexity. In addition, although time to build a dynamic tree is not necessarily shorter than time to access a static tree, in certain circumstances overall performance cost of building a dynamic communication tree can be attractive when compared to a permanent object tree which must be stored persistently on disk thus absorbing otherwise usable disk space. Accordingly, embodiments of the present invention provide significant accuracy, reliability, robustness, flexibility, cost and other advantages over prior art embodiments.

It is thus a general object of the present invention to provide improved communication in a client server network.

It is another general object of the present invention to provide improved scalability of communication within a distributed system such as a client server network having a large number of nodes or objects, without need for an intermediary server.

It is yet another object of the present invention to provide an improved technique for managing components or nodes, such as storage systems or storage area network (SANs) in a client server network environment utilizing dynamic or reconfigurable communication trees.

Other objects and advantages will be understood after referring to the detailed description of the preferred embodiments and to the appended drawings wherein:

DESCRIPTION OF THE PREFERRED EMBODIMENTS

Figure 3:
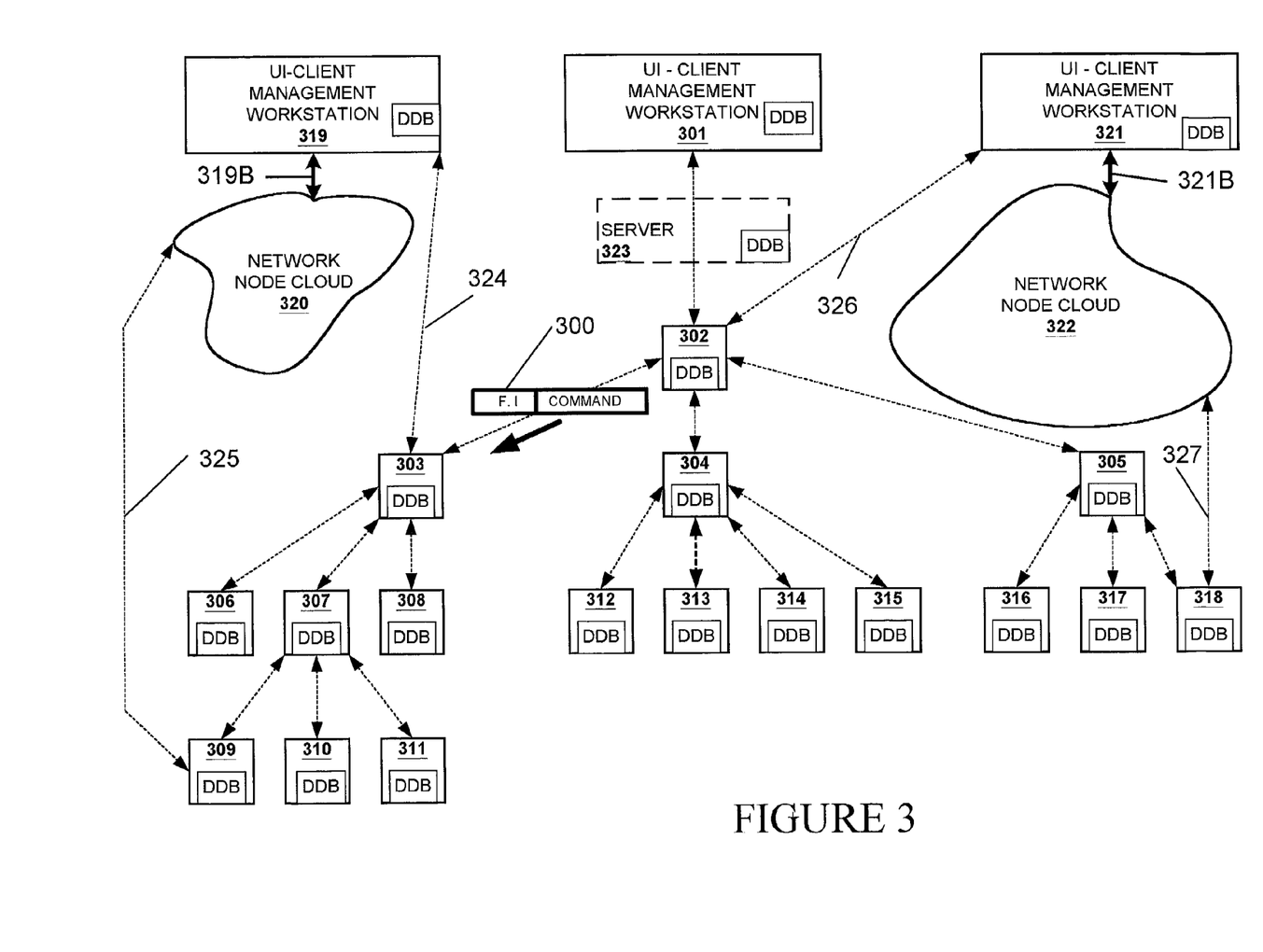
FIG. 3 is a block diagram of a client-server network communication tree configuration embodiment of the present invention.

FIG. 3—Dynamic Communication Tree

Referring to FIG. 3, there is depicted a block diagram of a client-server network having a communication tree configuration of the type which can be utilized by embodiments of the present invention. Client or User Interface (UI) or management work station 301 is shown operatively coupled via dotted-line bidirectional communication paths to nodes or objects or components 302–318 arranged or operatively intercoupled in a tree configuration. These nodes could be, for example, storage systems or Storage Area Network (SANs) and/or objects within one or more of such storage systems or SANs. The bidirectional communication path connecting client 301 with node 302 appears as a dotted-line through dashed-line server 323, the dotted and dashed line representations intending to suggest two things: (1) the dotted-line representation of this communication path (and of all communication paths shown) suggests that it is a dynamic and instantaneous path, where it can be manifested or created for a particular need and dismantled upon satisfying that need; and (2) although placement of such a server in this position is no longer needed for scalability purposes when utilizing embodiments of the present invention, usage of these embodiments does not preclude utilization of a server in this position if convenient or desired under particular circumstances. In any event, such a server would not be relatively large or expensive compared with its network nodes or client as would likely be experienced in the prior art, and, as noted, embodiments of the present invention allow such a server to be completely eliminated from the network if desired.

Node 302 is the root node of this tree and is operatively coupled by bidirectional communication paths, as shown, to its child nodes 303, 304, and 305. Child node 304 is the parent node for, and operatively coupled via bidirectional communication paths to, its child nodes: 312, 313, 314, and 315. Child node 305 is the parent node for, and operatively coupled via bidirectional communication paths to, its child nodes: 316, 317, and 318. Nodes 312–318 inclusive are each leaf nodes. Child node 303 is the parent node for, and operatively coupled via bidirectional communication paths to, its child nodes: 306, 307, and 308. Child (grandchild) node 307 is the parent node for, and operatively coupled via bidirectional communication paths to, its child (great-grandchild) nodes: 309, 310, and 311. Nodes 306, 308, 309, 310, and 311 are leaf nodes. Directory data base DDB (about which more detail is presented below) is shown distributed throughout the entire network and is depicted in each node as well as client 301 and server 323 (if used). Packet 300 is shown associated with the communication path between nodes 302 and 303. Packets are forwarded over all such paths, but are not shown in this Figure except for this one packet example for purposes of enhancing clarity of presentation. Detailed discussion of packets is presented in connection with FIG. 3B hereinbelow. Also shown are two other user interfaces or clients 319 and 321 operatively connected via bidirectional busses 319B and 321B respectively to their respective network node clouds 320 and 322 (intending to suggest large numbers of networked-nodes). As will be discussed below, these two other clients and nodes can have operative interaction with the same nodes deployed in the depicted instantaneous and dynamic network communication tree of client 301. But, first consider construction of the tree itself.

As noted, each node in the network communication tree of FIG. 3 contains a directory data base labeled DDB. A generic directory data base is essentially one place where data lives persistently, even if power to the system is shut off. In a possible implementation of creating a distributed directory database for the network of FIG. 3, all nodes simply mount a shared drive (not shown), In other words, all nodes access a file in a shared drive in a DDB server which can hold the directory database in one central location on that server (not shown). Each node requests the information that belongs to it, and, under these circumstances, each node gets the same information. Thus, the directory data base of FIG. 3 is the same in each node of the communication tree, since each node's data base contains the same directory data, namely, a list of IP (Internet Protocol) addresses for all nodes in the network. Thus, any node which may be selected by client 301 as its root node has the capability of accessing its own directory data base to obtain a complete address layout of all other nodes in its network. Such selected root node then can design and, in cooperation with other network nodes, build a suitable communication tree for the entire network based on the network nodes' addresses in the root node's directory database. The communication tree is designed and built in accordance with a suitable algorithm.

One such suitable algorithm, for example, is for root node 302 to select up to the first K (K being a positive integer) nodes in its database as its children, then select up to the next K nodes in its database as children of one of its children, then select up to the next successive K nodes as children of another of its children, etc., until either of the following two conditions are met: (1) all nodes in its database are selected—or—(2) each child of root node 302 has acquired K children (grandchildren of root node 302) with unselected nodes remaining in the root node's database. If condition (1) is met the 11 algorithm stops. If condition (2) is met, selection of succeeding blocks of up to K number of nodes per block is continued by placing each succeeding block as children of the grandchildren until either of the same two conditions are met. If condition (2) is again met the procedure continues from there in like fashion until all nodes in directory data base DDB are selected. The number K being equal to twenty in the foregoing example has been determined to allow construction of an optimum communication tree in particular operating environments, resulting in a communication tree that is not too wide and not too deep. The finalized configuration of the tree (the exact bidirectional communication paths from any one node to its immediate children) can then be used for communication between the root node and its immediate child nodes, and between such immediate child nodes in their role as parents and their respective child nodes, etc. As discussed in further detail hereinbelow, the communication tree is expressed in XML computer language.

A telephone communication analogy is now set forth to enhance clarity of presentation of operation of the present invention. In the present invention, the directory data base (DDB) is analogous to a telephone directory. Dynamic bidirectional communication paths are analogous to telephone calls placed to parties in a group. Parties in a group are analogous to nodes in a network. If each of the parties in the group has the same telephone directory (i.e. the same DDB) which lists no more than each telephone number belonging to each member in that group, and if a motivated party (i.e. root node) decides to send the same telephone message (i.e. the client's packeted "request" or "command") to the entire group, the motivated party can delegate telephone calling tasks to other parties in the group. The motivated party decides that no party shall call more than twenty other parties and decides to take the first twenty parties listed in the telephone book as parties to whom it shall make direct telephone calls (i.e. root node's "children"). The motivated party directs each of its directly called parties to call up to twenty pre-selected other parties, pre-selected by the motivated party (analogous to the root node delegating or assigning forwarding information specific to each of its child nodes). The motivated party further directs each of its directly called parties to further direct each of their twenty pre-selected other parties to call yet another twenty pre-selected parties, again pre-selected by the motivated party, etc. This fanning-out algorithm, implemented by the motivated party in cooperation with the other parties, constructs a dynamic communication tree, and is continued until all names, selected in groups of twenty, in the telephone book (i.e. all nodes in the network) are called. It may be that the very last of the parties to be so directed shall call fewer than twenty other parties if the total number of parties in the book (i.e. the total number of nodes in the network) is not evenly divisible by the number twenty. In each of the phone calls placed by each of the parties (nodes) to each of its assigned callees (child nodes) the same message (request or command) is stated. Thus the same message is communicated down from motivated party to each and every party (each and every node in the tree), where the labor of communicating is distributed evenly over the group of parties (distributed evenly over nodes in the network). Thus, the motivated party (root node) designs the entire communication tree (assigns particular phone numbers to be called to particular parties), and the telephonic communication to the group is accomplished (the communication tree is built) by the motivated party calling and, cooperatively, with all such particular other parties calling (by the root node sending packets and, cooperatively, with other network nodes forwarding the packets as directed by the root node). This analogy shall be continued hereinbelow when discussion about the response to the client's request is presented.

Figure 3A:
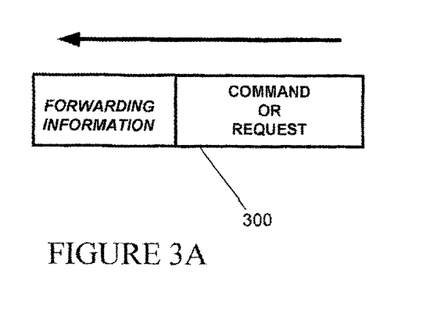
FIG. 3A is a schematic diagram of an information packet which could be supplied by the client workstation, including request and forwarding information.

In operation, after the tree in FIG. 3 has been constructed in accordance with the above description, (and more information about depicted bidirectional communication paths will be presented below) client 301 (which in this example selects node 302 as its root node) forwards information to root node 302 via the bidirectional communication path shown (either directly or through server 323 as previously described). This information is in the format of a packet containing a command or request and further containing forwarding information from which the entire communication tree is constructed or manifested. The command might be, for example, a request for information about all logical units (LUNs) that exist in each node, or, for another example, all storage system fan failures. Referring to FIGS. 3 and 3A, packet 300 is shown containing both the client's command or request and address/forwarding information. This packet is a software object construct written, in a preferred embodiment, in the XML computer language. The client's command or request is typically related to determination of operating state of a particular aspect or component in the client server network, such as, for example, failed or degraded disk drives, etc. The address/forwarding information is established by the root node for its entire communication tree. An example of such information which would appear in depicted packet 300 appears in Table I, as follows:

TABLE I

SAMPLE FORWARD TREE STATEMENT IN XML

```
<ROOT>
    <NODE address=">128.230.52.127">
    <NODE address=">128.227.52.127"/>
    <NODE address=">128.226.52.127"/>
    <NODE address=">128.225.52.127"/>
    </NODE>
    <NODE address=">128.229.52.127">
    <NODE address=">128.224.52.127"/>
    <NODE address=">128.223.52.127"/>
    <NODE address=">128.222.52.127"/>
    </NODE>
    <NODE address=">128.228.52.127">
    <NODE address=">128.221.42.111"/>
    </NODE>
</ROOT>
```

This is a simple example of code information of the type that could be included in packet 300, and is intentionally simplified to enhance clarity of presentation. Thus, the same command is usually communicated throughout the network via the communication tree in accordance with such forwarding information based on IP addresses. These IP addresses can be varied in number and can be selected by the root node (or its client workstation) in a manner to send the packet to only one node as if it were a leaf node, or to send the packet to all nodes in the network, or to send the packet to only a subtree (or subtrees) of the network.

Thus, there are at least three different depths of inquiry for the command or request resulting in three different operating modes.

(1) It may be that in a particular instance client 301 wants a response only from a node or from its root node 302, in which case the forwarding information indicates: do not forward and treats such node or root node 302 as if it were a leaf node as earlier discussed in connection with Table I.

(2) At the other extreme, it may be that in a different particular instance client 301 wants a response from every node in the network in which case the client's forwarding information so indicates in the packet sent to node 302. Node 302 then forwards the same command to its three children, nodes 303, 304, and 305 with forwarding information tailored differently for each child because each child shall be the root node of its own subtree, each subtree necessarily being different from the other. For node 303, its subtree forwarding information is tailored to indicate: forward to leaf node 306 and stop; forward to node 307 and have node 307 forward to its child leaf nodes 309, 310, and 311 and stop; and, forward to leaf node 308 and stop. By contrast, for node 304, the forwarding information is tailored differently to indicate: forward to each of leaf nodes 312, 313, 314, and 315 and stop. And, by further contrast, for node 305, the forwarding information is tailored still differently to indicate: forward to each of leaf nodes 316, 317, and 318 and stop as earlier discussed in connection with Table I.

(3) Finally, there could be an in-between condition where client 301 wants to forward such command to only a specified subset of all nodes in the network and client 301 provides such subset forwarding information by way of a packet directed to root node 302 which, in turn, forwards the packet accordingly to appropriate nodes in the subset, etc. This forwarding information is based on the individual IP addresses available to each node in its respective directory database as earlier discussed in connection with Table I.

Responses to the request or command flow in the reverse direction, each response along a unique path from each child node to its parent, until they are received by root node 302 and from there to client 301. As can be seen from FIG. 3, a node can be both a child node and a parent node; for example, node 307 is a child node of node 303 and is a parent node of nodes 309, 310, and 311. In one embodiment of the present invention, this response flow is controlled in a particular manner through the use of an information response list deployed in each parent node. These lists contain all response objects returned to parent nodes by their respective child nodes. This list must be completed for each parent node by having all of its children's information included in the list prior to forwarding the completed list to such parent node's parent, where the same procedure is repeated until the list deployed in the parent node's parent is likewise completed and further forwarded upwards, etc., in the direction of location of the root node. The format for these responses would be a list of objects. In one preferred embodiment these objects are represented in XML computer language.

Referring back to the telephone analogy earlier presented, the responses to the request or command are analogous to each child party telephoning its parent party with its "complete information" responsive to the received request as soon as each such child party receives all of the responses from each of its own children. In other words, in FIG. 3, node 307, which is both a parent and child node, waits until it receives all of the response messages from each of its own children 309, 310, and 311 before it rolls-up those response messages and combines them with its own individual response message into a "complete information" response which is then forwarded-up to its parent, node 303. In the telephone analogy, each parent node is awaiting receipt of a telephone message from each of its children before it reports back up to its own parent; in the information tree reality, each parent node is awaiting completion of its own list with entries of informational responses from each of its children before it forwards its completed list to its parent.

The dynamic aspect of the communication tree configuration includes the dismantling of the tree after it has been used, i.e., after all responses to a particular command that are going to be received by the client have been received. Thus, for a subsequent command from the same client to the same network, the same or a different communication tree configuration might be manifested as a function of various factors such as, for example, whether or not the client picked the earlier-used root node again as the instant root node, or whether or not the same nodes in the network that were operative during the earlier particular command are still operative at the time of occurrence of this subsequent command, etc. For subsequent commands that are operationally different and request different information from that requested by the earlier one, the client may want to use nodes which are different from the earlier-used node as its new root nodes for efficiency, reliability, logic or other reasons. This dynamic aspect of the present invention lends itself to such subsequent command operation.

Moreover, multiple object trees can co-exist in the same network simultaneously. It should be visualized that in the same population of nodes comprising a network there can be a group of root nodes each being simultaneously used for one of a like multiple of dynamic object trees. For example, referring to FIG. 3, client 319 is operatively coupled by bidirectional bus 319B to its own network node cloud 320. By way of its access to DDB (as shown) and its connection via bidirectional communication path 324, client 319 has selected node 303 as its dynamic root node for a particular inquiry it wishes to make of, or particular command it wishes to impose on, network nodes shown in the communication tree associated with client 301. Thus, although node 303 is not a root node in the instantaneous and dynamic communication tree shown associated with client 301, it shall be the root node of a second instantaneous, dynamic, and concurrent communication tree motivated into existence by client 319 and having a different communication tree configuration (not shown). Furthermore, as yet another example, one of the network nodes in node cloud 320 may, at or about the same time, also want to make an inquiry of the network associated with client 301 and such inquiry can make yet another node a root node for a third dynamic and co-existing or co-pending information tree (not shown). In FIG. 3, bidirectional communication path 325 is shown operatively coupled to node 309, making node 309 the root node in this third co-existing object tree. Client 319 can store directory databases in addition to DDB which is intended in this example to be particularly associated with the communication tree having node 302 as its root.

Similar comments are applicable to the other client-server network depicted. Client 321 is operatively coupled via bidirectional bus 321B to its network 322, where yet another inquiry is being made. Client 321 is connected via its bidirectional communication path 326 to node 302, and one of the nodes in its network node cloud 322 is connected to node 318 via bidirectional communication path 327. These connections imply that additional inquiries are being made of, or commands imposed on, network nodes depicted in the communication tree associated with client 301, where nodes 302 and 318 are yet additional root nodes for yet additional dynamic, instantaneous and co-existing network information trees. Accordingly, any one or more of these co-existing information trees can be dismantled upon completion of its communication mission while other trees are being created substantially at the same time from commands originating from virtually any operatively interconnected client or node. Client 321 can store directory databases in addition to DDB which is intended in this example to be particularly associated with the communication tree having node 302 as its root.

The bidirectional communication paths to which reference has been made hereinabove are to be understood to be dynamic communication pathways between nodes, components, and/or objects. For example, if nodes in the dynamic object tree of FIG. 3 represent storage systems, then depicted bidirectional communication paths can include at least selected conductive or transmissive (such as hard-wire, optical, or other) communication paths directly interconnecting each such storage system to all others. Or, bidirectional communication paths could include at least the selected conductive or transmissive communication paths which circuitously meander from a communication source (parent or child) to a communication destination (its child or parent respectively) by passing through connections such as those located in intermediary storage systems or other network components (not shown). Or, bidirectional communication pathways could be combinations of both types of pathways. As soon as any particular dynamic communication pathway is no longer needed, it is functionally dismantled, although the physical connectivity over which it operated or communicated shall remain intact.

For another example, if nodes in the tree of FIG. 3 represent generic software objects (software containers—dedicated areas of memory), then the bidirectional communication paths depicted rely upon not only the infrastructure described above, but also rely upon any additional software that may be required to interface with any of these objects to enable their contents to be represented by electrical, optical or other signals which can be conducted or transmitted over the physical connectivity described above. A salient distinguishing feature of these bidirectional communication paths as applied in embodiments of the present invention is that they are dynamic structures capable of both instantaneous assembly under control of a client or root node upon occurrence of need therefor such as when a command or request for information is to be issued, and instantaneous disassembly when such need is satisfied such as upon completion of responses to such command or request. Dynamic communication trees of the present invention can be constructed and dismantled without regard to any permanent object tree configurations that may exist or persist in, or be used by, the network. These dynamic tree configurations may, or may not, be congruent with any permanent object tree configurations that may be stored and used by the network to accomplish other tasks, there is normally no functional connection between these two different types of trees.

Figure 3B:
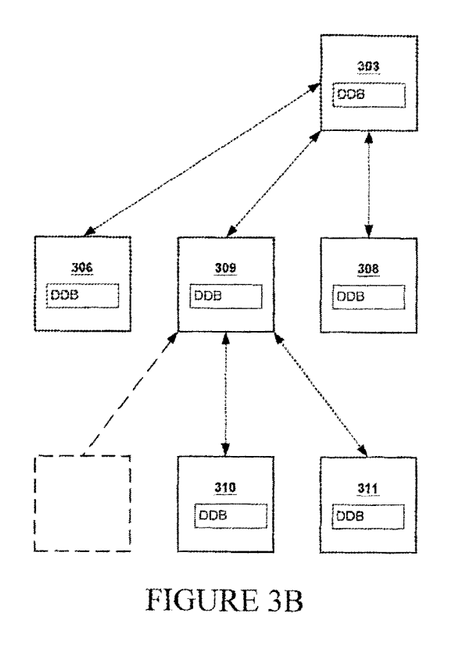
FIG. 3B is a replication of a portion of FIG. 3 showing substitution of an operative or healthy child node for an inoperative or sick parent node in a subset of the network or a subtree of the communication tree.

FIG. 3B—Dynamic Communication Tree—Node Substitution

Referring to FIG. 3B, a portion of FIG. 3 is represented. Nodes 303, 306, 308, 310, and 311 in FIG. 3B are intended to be identical to those having the same respective designations in FIG. 3. What is depicted is a condition where node 307 is inoperative. When the communication operation described above in conjunction with FIG. 3 is being conducted, inoperability of any node, such as node 307 in this example, can be determined. A variety of solutions to the problem imposed by an inoperable node in the network tree of the present invention is available because of the dynamic nature of the communication tree.

For example, one solution is based on the following: If parent node 303 sends a signal to its children and receives responses from all but child 307, parent node 303 can conclude that a problem exists with child node 307. Parent node 303 also knows, by way of its resident directory list of IP addresses, that its child node 307 is a parent of other nodes 309, 310, and 311. Since this tree is not a static tree, disabled or inoperative node 307 can be bypassed by substituting one of its operative child nodes therefor. Thus, operability of nodes 309, 310, and 311 are first determined, and by virtue of the dynamic nature of the communication tree of the present invention, any one of these operative child nodes could be chosen as a substitute. FIG. 3B shows that node 309 was selected and is repositioned in the place where inoperative node 307 had been located. Node 307 is removed from the tree. A high level of robustness, as reflected in this substitution example, and as reflected in embodiments of the present invention adapting to new network circumstances such as adding or deleting nodes, is a feature of the present invention.

Figure 4:
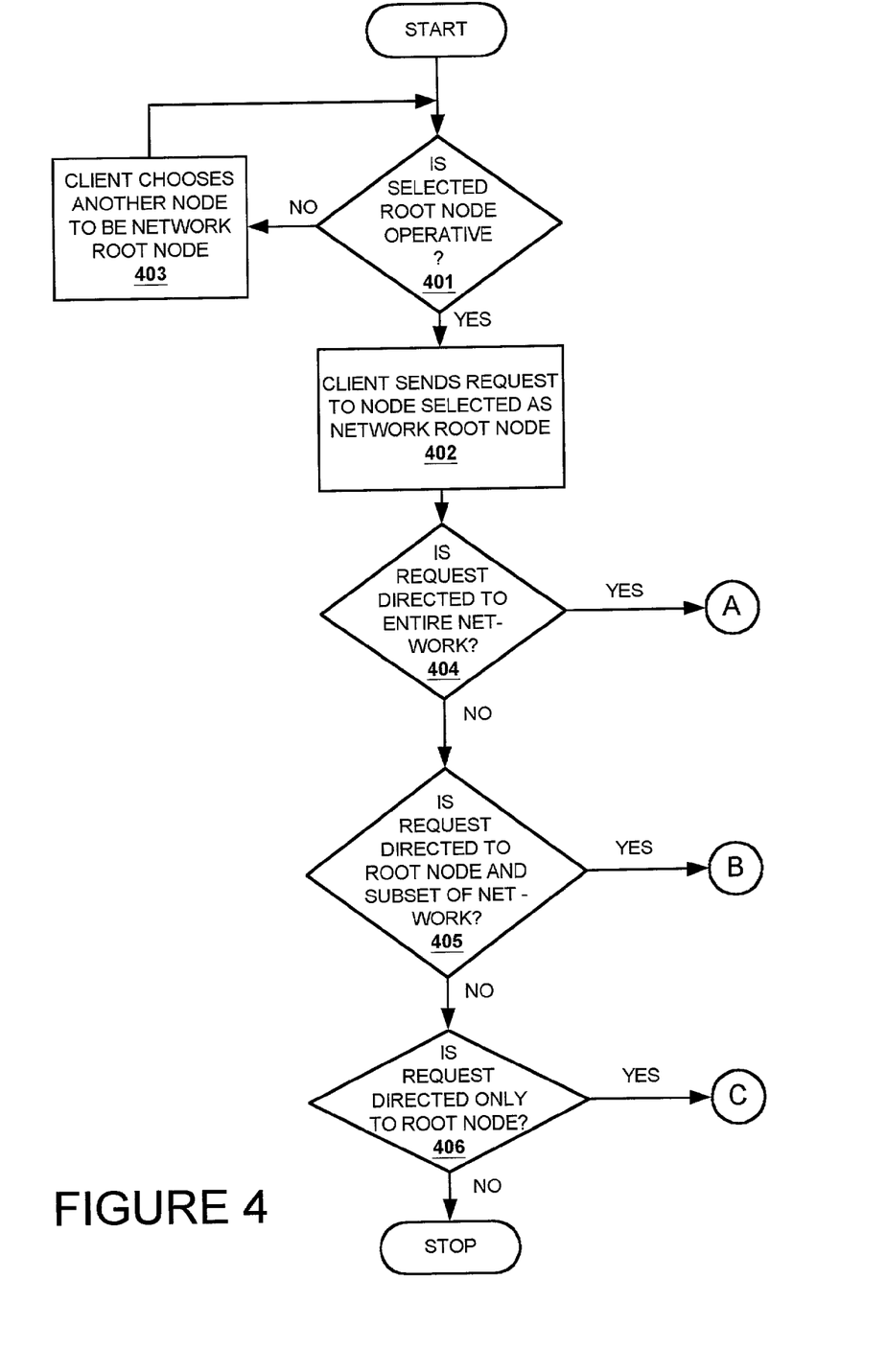
FIG. 4 is a flowchart illustrating one algorithmic aspect common to different operating modes of the present invention.

FIG. 4—Flowchart—Root Node and Operation Mode Selection

Referring to FIG. 4 in conjunction with FIG. 3, a flowchart is presented of an algorithm of the present invention relating to selection of root node by a client, such as client 301 of FIG. 3, which is an essential step regardless of which operation mode (degree of pervasiveness of the command issued by the client) is selected. The client must be certain that its selected root node is operative. In decision block 401 the query is made regarding whether or not the selected node is operative. If the answer is no, then the algorithmic process moves to step 403 where the client chooses another node to be the network root node. The process moves from step 403 back to step 401 where the query is made again, and if the answer this time is "yes", the process then moves to step 402 where the client sends a request or command to the selected network root node.

The algorithmic process then must determine to what extent such command shall be promulgated throughout the network, or, in other words, which operating mode has been selected by the client. The process moves to decision block 404 where it is determined if the request or command is directed to the entire network associated with the client, such as all nodes 302 through 318 inclusive if referring to client 301 of FIG. 3. If it is determined that the request is directed to the entire network, the algorithmic process moves to tab "A" connecting into FIG. 5 to be discussed below. However, if it is determined that the request is not directed to the entire network the algorithmic process moves to the next decision block 405 wherein it is determined if the request is directed to both the root node and a further subset of the entire network, as, for example, root node 302 and only the subtree consisting of nodes 303, and 306 through 311 inclusive. If "yes", then the algorithmic process moves to tab "B" connecting into FIG. 6 to be discussed below. However, if it is determined that the request is not directed to the root node and a further subset of the entire network (and any subset including other complete or partial subtrees, would have met this condition) the algorithmic process moves to yet another decision block 406 wherein it is determined if the request is directed to only the root node, as for example, only root node 302. If "yes", the algorithmic process moves to tab "C" connecting into FIG. 7 to be discussed below. However, if determined that the request is not directed to only the root node the algorithmic process stops because such request was therefore not directed to any of the nodes in this network.

Figure 5:
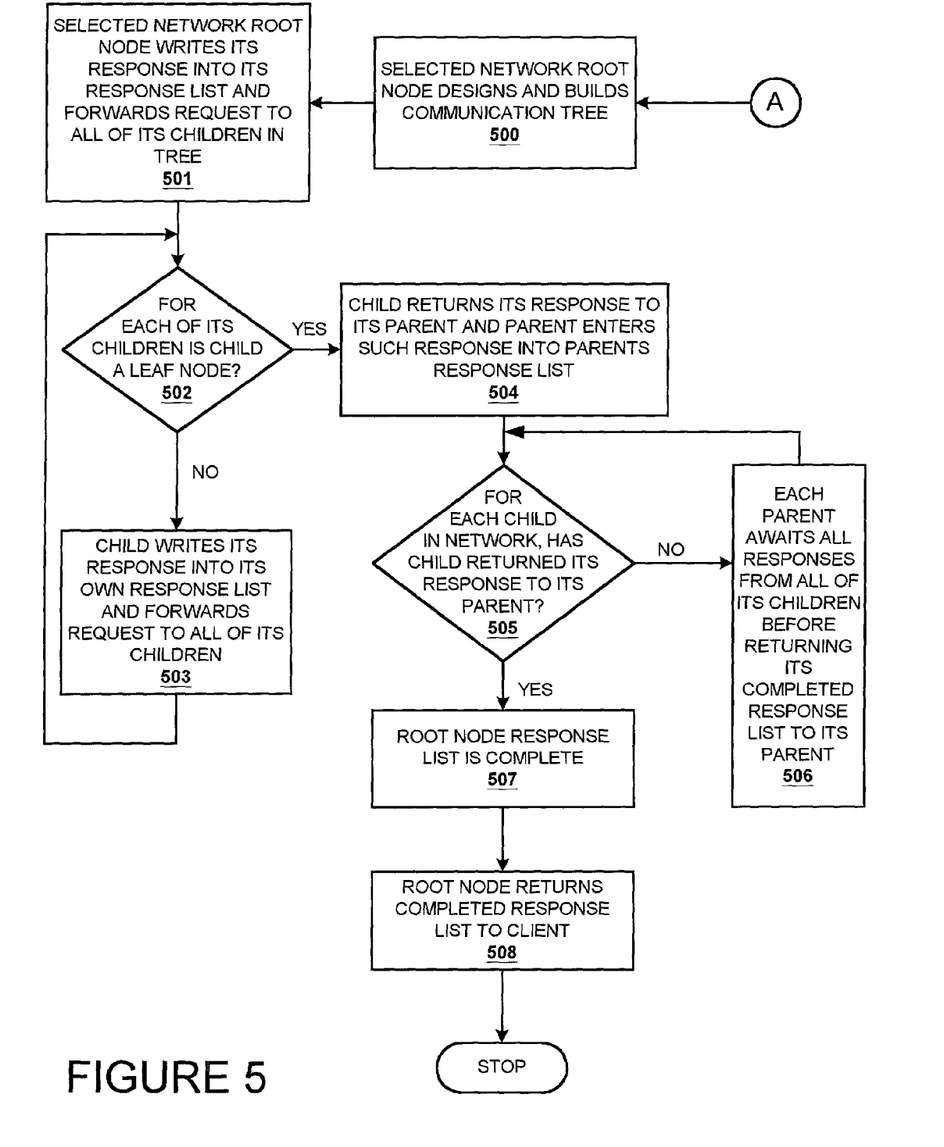
FIG. 5 is a flowchart algorithmically illustrating a first operating mode of the present invention in which commands are forwarded throughout the network.

FIG. 5—Flowchart—Entire Network Operating Mode

Referring to FIG. 5 in conjunction with FIG. 3, in step 500 the selected network root node designs and builds the communication tree in accordance with the principles earlier presented. The algorithmic process then moves to step 501 wherein the selected network root node, node 302, writes its response to the request from client 301 into its own information response list and forwards the request to all of its children in the communication tree, nodes 303, 304 and 305. The algorithmic process moves to decision block 502 wherein the query is made: for each of its children is the child a leaf node in the communication tree? If "yes" the algorithmic process moves to step 504, but if "no" the algorithmic process moves to step 503. In step 503 each child writes its own response based on information it has within its own node into its own response list and forwards the request from client 301 to all of each child's children (e.g. node 303 forwards the request to nodes 306–308, node 304 forwards the request to nodes 312–315, and node 305 forwards the request to nodes 316–318). The algorithmic process returns to decision block 502 where the same leaf node question is asked of each child's children, and in our example nodes 306, 308, and 312–318 inclusive are leaf nodes for which the answer is "yes". For each of these leaf nodes the process moves to step 504, but for node 307, which is not a leaf node, the process repeats one more time through decision block 502. It should be understood that this iterative loop can repeat as many times as necessary until the conditions specified are satisfied. The simplified example of FIG. 3 is used herein only for purposes of enhancing clarity of presentation. Ultimately the client's request or command will reach all leaf nodes in the network communication tree at which point the iterative loop between blocks 502 and 503 will stop and all of the algorithmic process will continue from step 504.

In step 504 a child in the network's dynamic communication tree returns its response to its parent and such parent enters that response into its own response list. The algorithmic process moves to decision block 505 wherein the query is made: for each child in the network communication tree, has such child returned its response to its parent? If not, then each such parent waits for all responses from all of its children before returning its completed response list to its own parent, as illustrated in step 506. The algorithmic process moves back to decision block 505 where the same question is again asked, and if this time the answer is "yes"—then, each child in the network communication tree has returned its response to its parent, then the algorithmic process moves to step 507 illustrating that the root node response is now complete. At this point the entire network, which has been configured into a particular dynamic communication tree for this command or request, has completely responded to the client workstation's command or request. Each and every child node's contribution to the overall response has been rolled-up into its respective parent's list (a list which increased to a maximum of K entries, where K can equal twenty in a preferred embodiment in accordance with an earlier discussion) which ultimately has been funneled back to the root node. The root node now has a completed response list comprised of the entire network's response and it returns such completed response list to client 301 which satisfies the client's response or command. Accordingly, if this were an inquiry about, for example, all LUNs existing in the network, then the client would now have received complete information about all LUNs.

Figure 6:
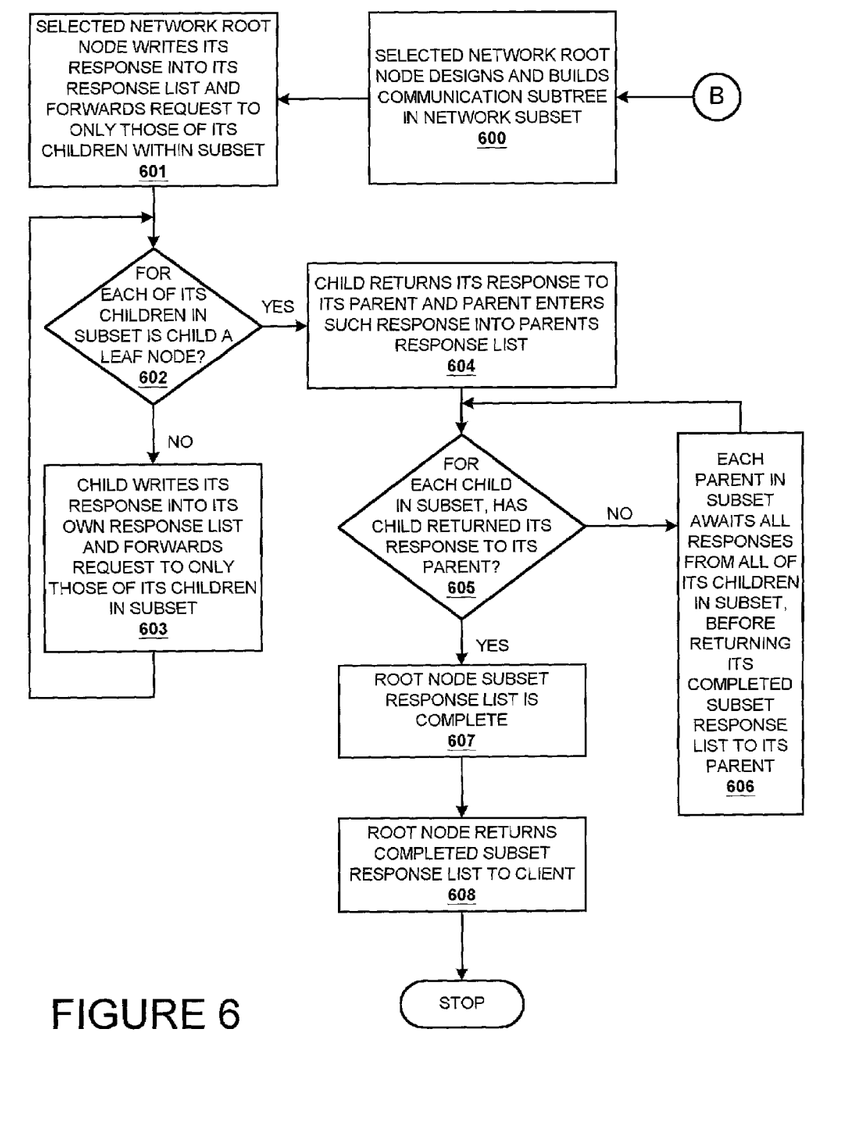
FIG. 6 is a flowchart algorithmically illustrating a second operating mode of the present invention in which commands are forwarded to a subset of the network or a subtree of the communication tree including the root node; and, FIG. 7 is a flowchart algorithmically illustrating a third operating mode of the present invention in which commands are forwarded to only one node or to the root node.

FIG. 6—Flowchart—Network Subset Operating Mode

Referring to FIG. 6 in conjunction with FIG. 3, in step 600 the selected network root node designs and builds the communication tree in accordance with the principles earlier presented. The algorithmic process then moves to step 601 wherein the selected network root node, node 302, writes its response to the request from client 301 into its information response list and forwards the request to a network subset such as a subtree of the communication tree in accordance with information contained in the client's request. For example, this subset could be the subtree with node 303 as its subtree root node. The algorithmic process moves to decision block 602 wherein the query is made: for each of its children in the network subset or communication subtree is the child a leaf node? If "yes" the algorithmic process moves to step 604, but if "no" the algorithmic process moves to step 603. In step 603 each child in the network subset or communication subtree writes its own response based on information it has within its own node into its own response list and forwards the request from client 301 to all of each child's children in the subset (e.g. node 303 forwards the request to nodes 306–308, if all three child nodes are in the client-defined subset). The algorithmic process returns to decision block 602 where the same leaf node question is asked of each child's children in the network subset or communication subtree, and in our example nodes 306 and 308 are leaf nodes for which the answer is "yes". For each of these leaf nodes the process moves to step 604, but for node 307, which is in the subset but not a leaf node, the process repeats one more time through decision block 602. It should be understood that this iterative loop can repeat as many times as necessary until the conditions specified are satisfied and that the simplified example of FIG. 3 is again used herein only for purposes of enhancing clarity of presentation. Ultimately the client's request or command will reach all leaf nodes in the network subset or communication subtree at which point the iterative loop between blocks 602 and 603 will stop and all of the algorithmic process will continue from step 604.

In step 604 a child in the network subset or the network's dynamic communication subtree returns its response to its parent in the subset and such parent enters that response into its own response list. The algorithmic process moves to decision block 605 wherein the query is made: for each child in the subset, has such child returned its response to its parent in the subset? (A parent could be excluded from the subset. There can be conditions under which the client might wish to exclude certain nodes within a subtree from the defined subset and that might eliminate a node otherwise functioning as a parent. For example, if node 307 is excluded which was the parent of nodes 309, 310, and 311, then another node becomes the substitute parent. Either node 303, 309, 310, or 311 could then become the substitute parent, in this example.) If not, then each such parent waits for all responses from all of its children in the network subset or communication subtree before returning its completed response list to its own parent in the subset, as illustrated in step 606. The algorithmic process moves back to decision block 605 where the same question is again asked, and if this time the answer is "yes"-then each child in the network communication tree subset has returned its response to its parent in the subset. The algorithmic process next moves to step 607 illustrating that the root node's subset response list is now complete. At this point, this particular subset of the entire network has been configured into a particular dynamic communication subtree for this command or request, and has completely responded to the client's command or request. The contribution of each and every child node in the subset to the overall response has been rolled-up into its respective parent's list (K entries maximum in a preferred embodiment) which ultimately has been funneled back to the root node. The root node now has a completed subset response list comprised of this network subset's response and it returns such completed subset response list to the client which satisfies the client's response or command. Accordingly, if this were an inquiry about, for example, all fan failures existing in this subset of the network or communication subtree, then the client would now have received all such fan failure information.

Figure 7:
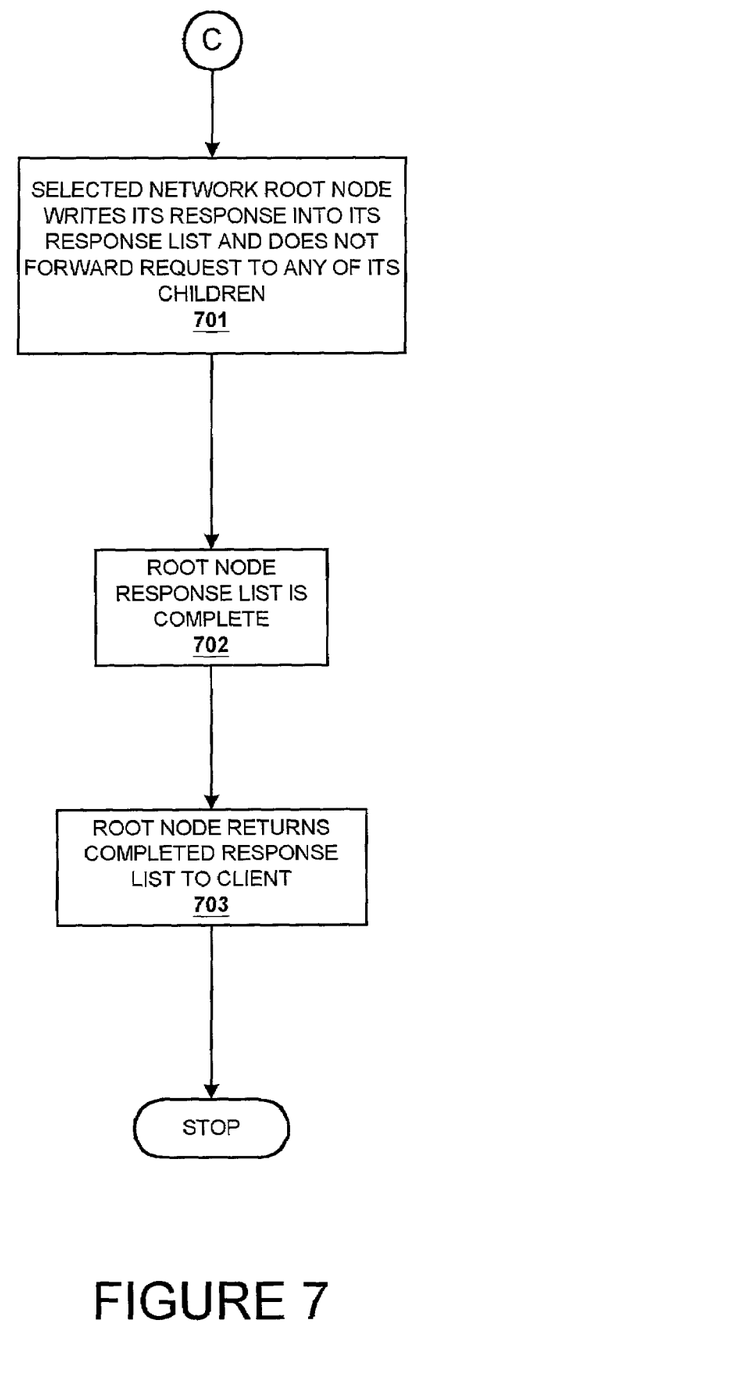

FIG. 7—Flowchart—Root Node Only Operating Mode

Referring to FIG. 7, in this instance the client's request involves only the root node, and no other node in the network. In step 701, the selected network root node writes its response to the client's request into its response list, and does not forward the request to any of its children. The algorithmic procedure moves to step 702 where the root node response list is illustrated as being complete. The algorithmic process moves to step 703 where the root node returns the completed response list (containing only one entry) to its client. The algorithmic process then stops. Although this may seem like an abrupt procedure, there may be circumstances where the client wishes to communicate only with its root node for purposes of readying its operative interconnection for a particular set of commands or for other reasons. For example, this algorithm is applicable whenever a client needs to talk to only one other node and this could occur when the client knows that an information item it needs to access is located on exactly that one node.

The present embodiments are to be considered in all respects as illustrative and not restrictive. Embodiments of the present invention can be implemented in a variety of programming languages, such as C++ or Java. Languages such as XML (extensible markup language) can be used to encode communication between nodes in the network. The scope of the invention is indicated by the appended claims rather than by the foregoing description, and all changes which come within the meaning and range of equivalency of the claims are therefore intended to be embraced therein.

What is claimed is:

1. In a network, a system for communicating between any one node and all other nodes in said network comprising:
   means for establishing a directory data base in each of said one node and said all other nodes, said directory data base providing an address of each of said one node and said all other nodes;
   means for building a dynamic communication tree from said one node in cooperation with said all other nodes in accordance with each respective said address;
   means for establishing communication packets, each of said packets containing both a command to be executed and forwarding information based on configuration of said communication tree;
   means for forwarding said packets from said one node to said all other nodes in accordance with said forwarding information;
   each of said all other nodes containing means, responsive to operation of said forwarding means, for executing said command thereby providing a command response and for returning said response to said one node.

2. The system of claim 1 and wherein said one node is a user interface and further comprising:
   means for selecting a node of said communication tree from said all other nodes as root node.

3. The system of claim 2 and wherein said selecting means further comprises:
   means for determining if said node is operative; and
   means, responsive to operation of said selecting means, for selecting a different node if said node is not operative.

4. The system of claim 1 and wherein said address is an IP address.

5. The system of claim 1 and wherein said communication tree building means comprises: means for limiting the children of any node in said tree to no more than a fixed number.

6. The system of claim 5 and wherein said fixed number is twenty.

7. The system of claim 1 and wherein said dynamic communication tree building means comprises:
   means for dismantling said dynamic communication tree when said communicating between said any one node and said all other nodes in said network is completed.

8. The system of claim 7 and wherein said dynamic communication tree building means comprises:
   means for rebuilding another dynamic communication tree in response to need established by the next said command.

9. The system of claim 1 and wherein said forwarding means comprises:
  means for determining if each one of said all other nodes placed as parent nodes is operative; and,
  means, responsive to operation of said determining means determining that any one of said parent nodes is not operative, for substituting seriatim child nodes of said any one of said parent nodes in place of said any one of said parent nodes until an operative child node is determined.

10. The system of claim 1 and wherein said command response returning means comprises:
  means for creating a response list in each of said all other nodes;
  means, established in each parent node situated within said all other nodes, for registering a parent command response on its respective said response list;
  means, further established in said each parent node, for registering on said its respective response list said command response from each of the children of said each parent node thereby establishing a completed child command response;
  means for combining said parent command response with said completed child command response on said its respective said response list, thereby obtaining a finalized response list; and,
  means for returning said finalized response list to the parent of said each parent node.

11. The system of claim 1 and wherein said command response returning means returns said response to said one node along a unique point-to-point path of said communication tree.

12. The system of claim 1 further comprising:
  means for accepting at least one additional node into said network and for reconfiguring said dynamic communication tree to conform to the addition of said at least one additional node.

13. The system of claim 1 further comprising:
  means for dis-engaging at least one of said all other nodes from said network and for reconfiguring said dynamic communication tree to conform to the deletion of said at least one of said all other nodes.

14. The system of claim 3 and wherein said address is an IP address.

15. The system of claim 14 and wherein said communication tree building means comprises: means for limiting the children of any node in said tree to no more than a fixed number.

16. The system of claim 15 and wherein said fixed number is twenty.

17. The system of claim 16 and wherein said dynamic communication tree building means comprises:
  means for dismantling said dynamic communication tree when said communicating between any one node and said all other nodes in said network is completed.

18. The system of claim 17 and wherein said dynamic communication tree building means further comprises:
  means for rebuilding another dynamic communication tree in response to need established by the next said command.

19. The system of claim 18 and wherein said forwarding means comprises:
  means for determining if each one of said all other nodes placed as parent nodes is operative; and,
  means, responsive to operation of said determining means determining that any one of said parent nodes is not operative, for substituting seriatim child nodes of said any one of said parent nodes in place of said any one of said parent nodes until an operative child node is determined.

20. The system of claim 19 and wherein said command response returning means comprises:
  means for creating a response list in each of said all other nodes;
  means, established in each parent node situated within said all other nodes, for registering a parent command response on its respective said response list;
  means, further established in said each parent node, for registering on said its respective response list said command response from each of the children of said each parent node thereby establishing a completed child command response;
  means for combining said parent command response with said completed child command response on said its respective said response list, thereby obtaining a finalized response list; and,
  means for returning said finalized response list to the parent of said each parent node.

21. The system of claim 20 and wherein said command response returning means returns said response to said one node along a unique point-to-point path of said communication tree.

22. In a network, a system for simultaneously communicating between at least any one of a plurality of nodes and all other nodes in said network including those in said plurality comprising:
  means for establishing a directory data base in each of said at least any one of a plurality of nodes and said all other nodes, said directory data base providing an address of each of said at least any one of a plurality of nodes and said all other nodes;
  means for building a like plurality of dynamic communication trees from said at least any one of a plurality of nodes in cooperation with said all other nodes in accordance with each respective said address, each of said communication trees corresponding respectively to one of said plurality of nodes;
  means for establishing a like plurality of different kinds of communication packets, each of said plurality of different kinds of communication packets corresponding respectively to one of said communication trees, and each packet of said plurality of different kinds of communication packets containing both a command to be executed and forwarding information based on configuration of its respective said one of said communication trees;
  means for simultaneously forwarding said each packet of said plurality of different kinds of communication packets to said all other nodes in said network including those in said plurality in accordance with said forwarding information; and,
  each of said all other nodes in said network including those in said plurality containing means, responsive to operation of said forwarding means, for executing said command thereby providing a command response and for returning said response to said at least any one of a plurality of nodes by way of said its respective said one of said communication trees.

23. In a network, a computer program product for use on a computer for simultaneously communicating between at least any one of a plurality of nodes and all other nodes in said network including those in said plurality, said computer program product comprising a computer usable medium having computer readable program code thereon, said computer readable program code comprising:

program code for establishing a directory data base in each of said at least any one of a plurality of nodes and said all other nodes, said directory data base providing an address of each of said at least any one of a plurality of nodes and said all other nodes;

program code for building a like plurality of dynamic communication trees from said at least any one of a plurality of nodes in cooperation with said all other nodes in accordance with each respective said address, each of said communication trees corresponding respectively to one of said plurality of nodes;

program code for establishing a like plurality of different kinds of communication packets, each of said plurality of different kinds of communication packets corresponding respectively to one of said communication trees, and each packet of said plurality of different kinds of communication packets containing both a command to be executed and forwarding information based on configuration of its respective said one of said communication trees;

program code for simultaneously forwarding said each packet of said plurality of different kinds of communication packets to said all other nodes in said network including those in said plurality in accordance with said forwarding information; and, each of said all other nodes in said network including those in said plurality containing program code, responsive to operation of said forwarding program code, for executing said command thereby providing a command response and for returning said response to said at least any one of a plurality of nodes by way of said its respective said one of said communication trees.

24. In a network, a method for communicating between any one node and all other nodes in said network comprising:

establishing a directory data base in each of said one node and said all other nodes, said directory data base providing an address of each of said one node and said all other nodes;

building a dynamic communication tree from said one node in cooperation with said all other nodes in accordance with each respective said address;

establishing communication packets, each of said packets containing both a command to be executed and forwarding information based on configuration of said communication tree;

forwarding said packets from said one node to said all other nodes in accordance with said forwarding information;

executing said command responsive to operation of said forwarding, thereby providing a command response; and, returning said response to said one node.

25. The method of claim 24 and wherein said one node is a user interface and further comprising:

selecting a node of said communication tree from said all other nodes as root node.

26. The method of claim 25 and wherein said selecting further comprises:

determining if said node is operative; and selecting a different node if said node is not operative.

27. The method of claim 24 and wherein said address is an IP address.

28. The method of claim 24 and wherein said communication tree building comprises: limiting the children of any node in said tree to no more than a fixed number.

29. The method of claim 28 and wherein said fixed number is twenty.

30. The method of claim 24 and wherein said dynamic communication tree building means comprises:

dismantling said dynamic communication tree when said communicating between said any one node and said all other nodes in said network is completed.

31. The method of claim 30 and wherein said dynamic communication tree building comprises:

rebuilding another dynamic communication tree in response to need established by the next said command.

32. The method of claim 24 and wherein said forwarding comprises:

determining if each one of said all other nodes placed as parent nodes is operative; and, responsive to determining that any one of said parent nodes is not operative, substituting seriatim child nodes of said any one of said parent nodes in place of said any one of said parent nodes until an operative child node is determined.

33. The method of claim 24 and wherein said command response returning comprises:

creating a response list in each of said all other nodes;

registering a parent command response on its respective said response list;

registering on said its respective response list said command response from each of the children of said each parent node, thereby establishing a completed child command response;

combining said parent command response with said completed child command response on said its respective said response list, thereby obtaining a finalized response list; and, returning said finalized response list to the parent of said each parent node.

34. The method of claim 24 and wherein said command response returning returns said response to said one node along a unique point-to-point path of said communication tree.

35. The method of claim 24 further comprising:

accepting at least one additional node into said network and for reconfiguring said dynamic communication tree to conform to the addition of said at least one additional node.

36. The method of claim 24 further comprising:

dis-engaging at least one of said all other nodes from said network and for reconfiguring said dynamic communication tree to conform to the deletion of said at least one of said all other nodes.

37. The method of claim 26 and wherein said address is an IP address.

38. The method of claim 37 and wherein said communication tree building comprises: limiting the children of any node in said tree to no more than a fixed number.

39. The method of claim 38 and wherein said fixed number is twenty.

40. The method of claim 39 and wherein said dynamic communication tree building comprises:

dismantling said dynamic communication tree when said communicating between any one node and said all other nodes in said network is completed.

41. The method of claim 40 and wherein said dynamic communication tree building further comprises:
  rebuilding another dynamic communication tree in response to need established by the next said command.

42. The method of claim 41 and wherein said forwarding comprises:
  determining if each one of said all other nodes placed as parent nodes is operative; and,
  responsive to determining that any one of said parent nodes is not operative, substituting seriatim child nodes of said any one of said parent nodes in place of said any one of said parent nodes until an operative child node is determined.

43. The method of claim 42 and wherein said command response returning comprises:
  creating a response list in each of said all other nodes;
  registering a parent command response on its respective said response list;
  registering on said its respective response list said command response from each of the children of said each parent node, thereby establishing a completed child command response;
  combining said parent command response with said completed child command response on said its respective said response list, thereby obtaining a finalized response list; and,
  returning said finalized response list to the parent of said each parent node.

44. The method of claim 43 and wherein said command response returning returns said response to said one node along a unique point-to-point path of said communication tree.

45. In a network, a method for simultaneously communicating between at least any one of a plurality of nodes and all other nodes in said network including those in said plurality comprising:
  establishing a directory data base in each of said at least any one of a plurality of nodes and said all other nodes, said directory data base providing an address of each of said at least any one of a plurality of nodes and said all other nodes;
  building a like plurality of dynamic communication trees from said at least any one of a plurality of nodes in cooperation with said all other nodes in accordance with each respective said address, each of said communication trees corresponding respectively to one of said plurality of nodes;
  establishing a like plurality of different kinds of communication packets, each of said plurality of different kinds of communication packets corresponding respectively to one of said communication trees, and each packet of said plurality of different kinds of communication packets containing both a command to be executed and forwarding information based on configuration of its respective said one of said communication trees;
  simultaneously forwarding said each packet of said plurality of different kinds of communication packets to said all other nodes in said network including those in said plurality in accordance with said forwarding information; and,
  responsive to operation of said forwarding, executing said command thereby providing a command response; and,
  returning said response to said at least any one of a plurality of nodes by way of said its respective said one of said communication trees.

46. In a network a computer program product for use on a computer for communicating between any one node and all other nodes in said network, said computer program product comprising a computer usable medium having computer readable program code thereon, said computer readable program code comprising:
  program code for establishing a directory data base in each of said one node and said all other nodes, said directory data base providing an address of each of said one node and said all other nodes;
  program code for building a dynamic communication tree from said one node in cooperation with said all other nodes in accordance with each respective said address;
  program code for establishing communication packets, each of said packets containing both a command to be executed and forwarding information based on configuration of said communication tree;
  program code for forwarding said packets from said one node to said all other nodes in accordance with said forwarding information;
  each of said all other nodes containing program code, responsive to operation of said forwarding program code, for executing said command thereby providing a command response and for returning said response to said one node.

47. The computer program product of claim 46 further comprising:
  program code for accepting at least one additional node into said network and for reconfiguring said dynamic communication tree to conform to the addition of said at least one additional node.

48. The computer program product of claim 46 and wherein said one node is a user interface and further comprising:
  program code for selecting a node of said communication tree from said all other nodes as root node.

49. The computer program product of claim 48 and wherein said selecting program code further comprises:
  program code for determining if said node is operative; and
  program code, responsive to operation of said selecting program code, for selecting a different node if said node is not operative.

50. The computer program product of claim 46 and wherein said address is an IP address.

51. The computer program product of claim 46 and wherein said communication tree building program code comprises: program code for limiting the children of any node in said tree to no more than a fixed number.

52. The computer program product of claim 51 and wherein said fixed number is twenty.

53. The computer program product of claim 46 and wherein said dynamic communication tree building program code comprises:
  program code for dismantling said dynamic communication tree when said communicating between said any one node and said all other nodes in said network is completed.

54. The computer program product of claim 53 and wherein said dynamic communication tree building program code comprises:
  program code for rebuilding another dynamic communication tree in response to need established by the next said command.

55. The computer program product of claim 46 and wherein said forwarding program code comprises:
  program code for determining if each one of said all other nodes placed as parent nodes is operative; and,
  program code, responsive to operation of said determining program code determining that any one of said parent nodes is not operative, for substituting seriatim child nodes of said any one of said parent nodes in place of said any one of said parent nodes until an operative child node is determined.

56. The computer program product of claim 46 and wherein said command response returning program code comprises:
  program code for creating a response list in each of said all other nodes;
  program code, established in each parent node situated within said all other nodes, for registering a parent command response on its respective said response list;
  program code, further established in said each parent node, for registering on said its respective response list said command response from each of the children of said each parent node thereby establishing a completed child command response;
  program code for combining said parent command response with said completed child command response on said its respective said response list, thereby obtaining a finalized response list; and,
  program code for returning said finalized response list to the parent of said each parent node.

57. The computer program product of claim 46 and wherein said command response returning program code returns said response to said one node along a unique point-to-point path of said communication tree.

58. The computer program product of claim 49 and wherein said address is an IP address.

59. The computer program product of claim 46 further comprising:
  program code for disengaging at least one of said all other nodes from said network and for reconfiguring said dynamic communication tree to conform to the deletion of said at least one of said all other nodes.

60. The computer program product of claim 58 and wherein said communication tree building program code comprises: program code for limiting the children of any node in said tree to no more than a fixed number.

61. The computer program product of claim 60 and wherein said fixed number is twenty.

62. The computer program product of claim 61 and wherein said dynamic communication tree building program code comprises:
  program code for dismantling said dynamic communication tree when said communicating between any one node and said all other nodes in said network is completed.

63. The computer program product of claim 62 and wherein said dynamic communication tree building program code further comprises:
  program code for rebuilding another dynamic communication tree in response to need established by the next said command.

64. The computer program product of claim 63 and wherein said forwarding program code comprises:
  program code for determining if each one of said all other nodes placed as parent nodes is operative; and,
  program code, responsive to operation of said determining program code determining that any one of said parent nodes is not operative, for substituting seriatim child nodes of said any one of said parent nodes in place of said any one of said parent nodes until an operative child node is determined.

65. The computer program product of claim 64 and wherein said command response returning program code comprises:
  program code for creating a response list in each of said all other nodes;
  program code, established in each parent node situated within said all other nodes, for registering a parent command response on its respective said response list;
  program code, further established in said each parent node, for registering on said its respective response list said command response from each of the children of said each parent node thereby establishing a completed child command response;
  program code for combining said parent command response with said completed child command response on said its respective said response list, thereby obtaining a finalized response list; and,
  program code for returning said finalized response list to the parent of said each parent node.

66. The computer program product of claim 65 and wherein said command response returning program code returns said response to said one node along a unique point-to-point path of said communication tree.

\* \* \* \* \*